Feb. 7, 1933. R. P. SIMMONS 1,896,111
METHOD OF MAINTAINING OIL WELLS IN FLOWING CONDITION
AND CONSERVING THE NATURAL GAS SUPPLY THEREOF
Filed Nov. 6, 1930 5 Sheets-Sheet 2
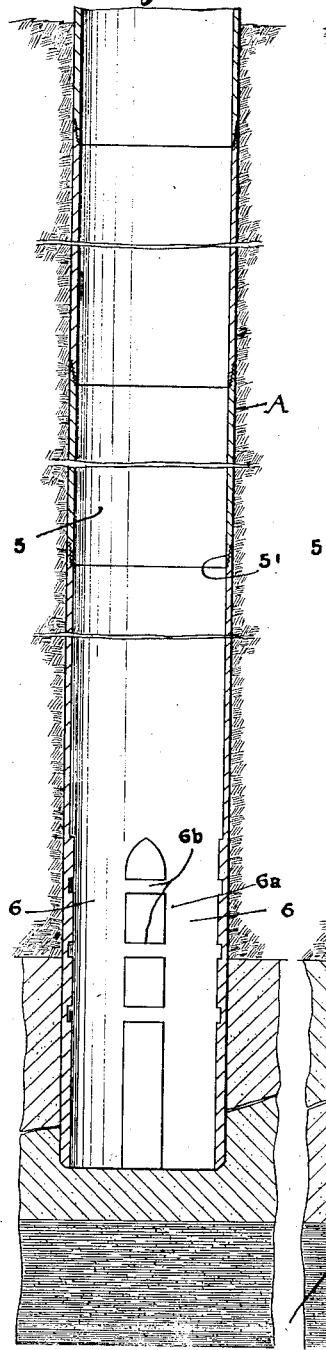
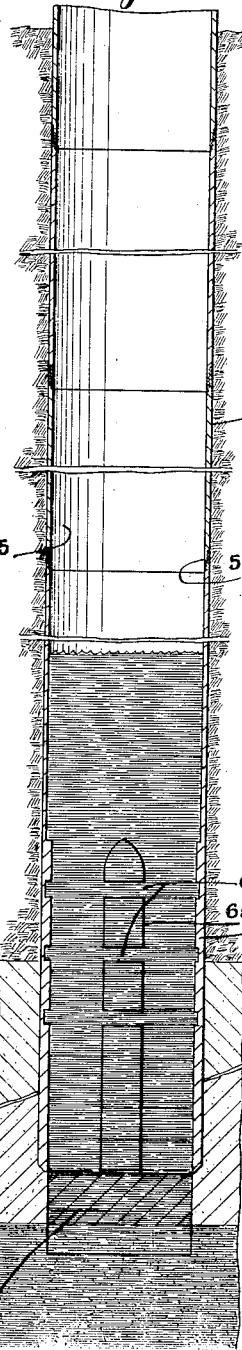
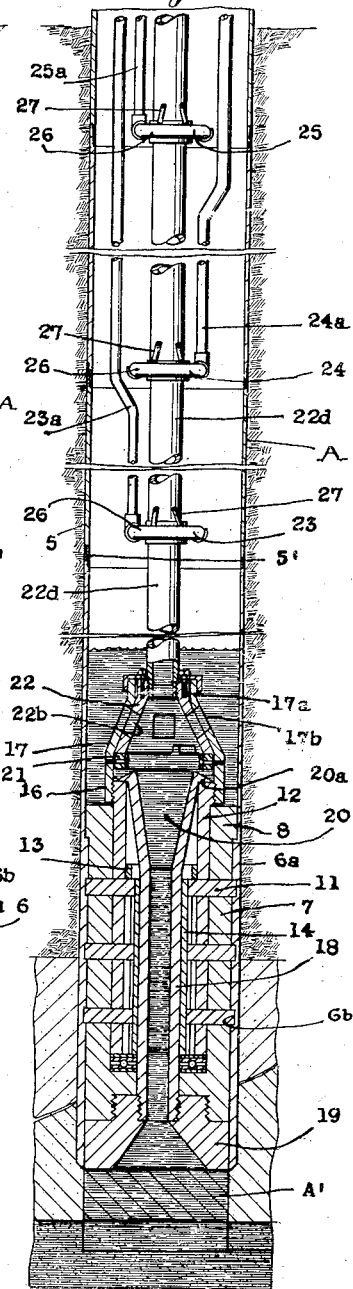
INVENTOR
RICHARD P. SIMMONS
BY
ATTORNEY Feb. 7, 1933.  R. P. SIMMONS  1,896,111
METHOD OF MAINTAINING OIL WELLS IN FLOWING CONDITION
AND CONSERVING THE NATURAL GAS SUPPLY THEREOF
Filed Nov. 6, 1930  5 Sheets-Sheet 3

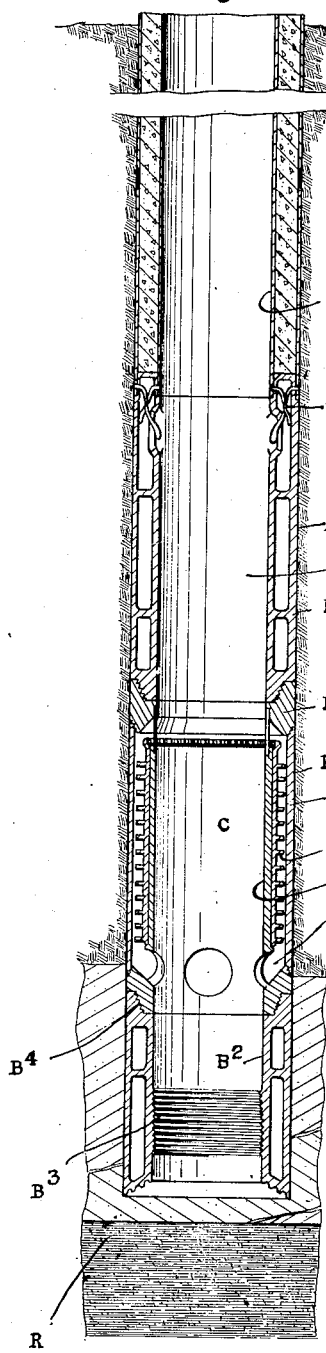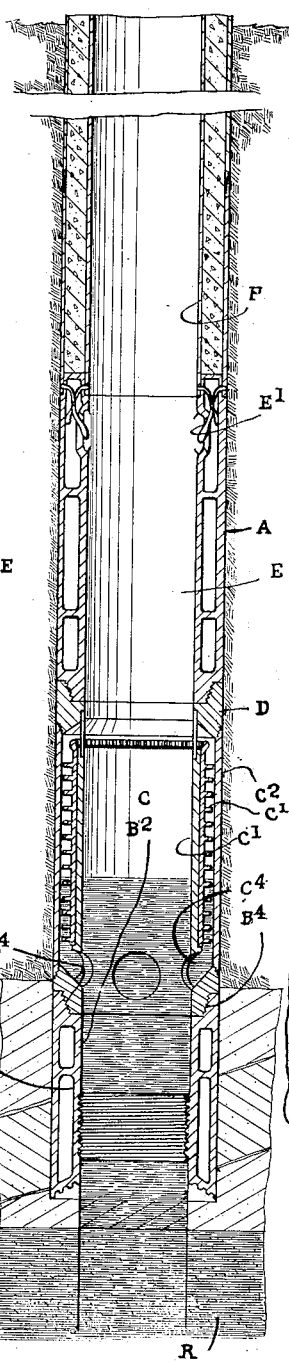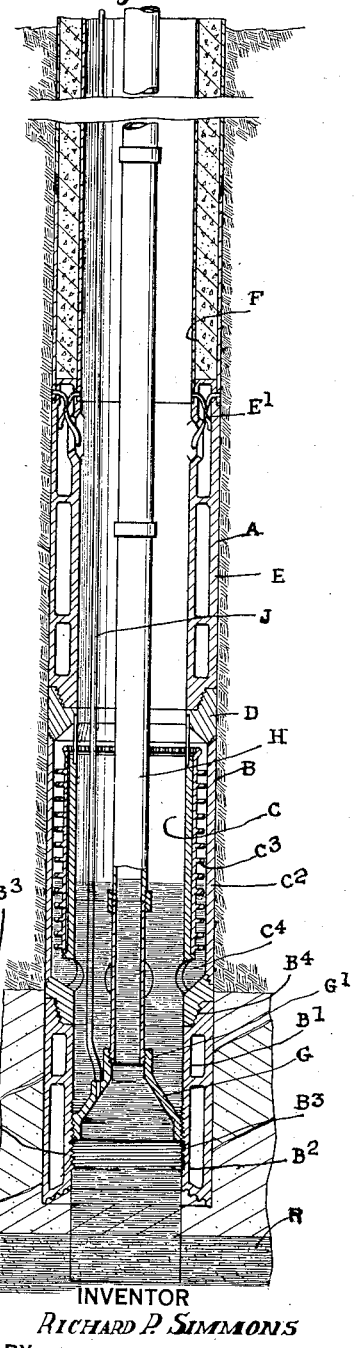

Feb. 7, 1933. R. P. SIMMONS 1,896,111
METHOD OF MAINTAINING OIL WELLS IN FLOWING CONDITION
AND CONSERVING THE NATURAL GAS SUPPLY THEREOF
Filed Nov. 6, 1930 5 Sheets-Sheet 4
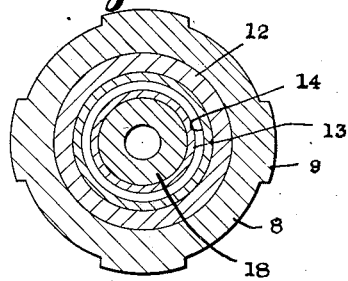
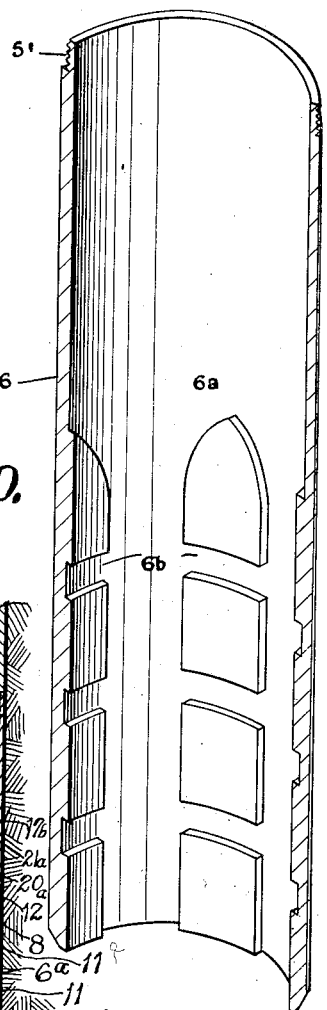
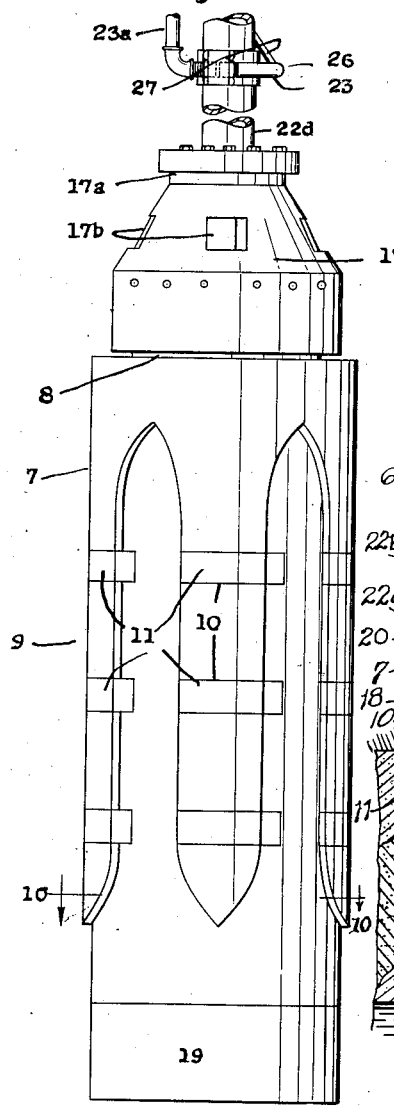
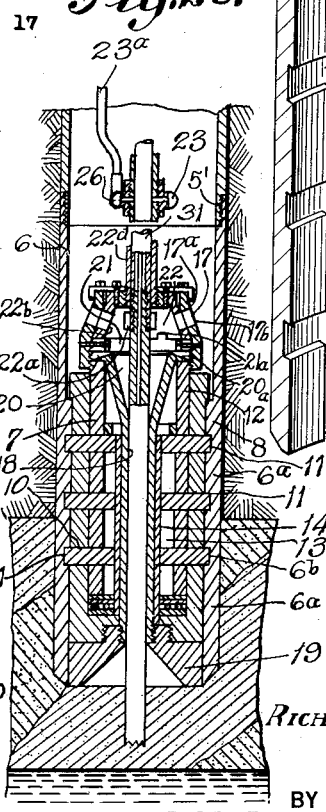
Richard P. Simmons
INVENTOR
BY
ATTORNEY Feb. 7, 1933. R. P. SIMMONS 1,896,111
METHOD OF MAINTAINING OIL WELLS IN FLOWING CONDITION
AND CONSERVING THE NATURAL GAS SUPPLY THEREOF
Filed Nov. 6, 1930 5 Sheets-Sheet 5
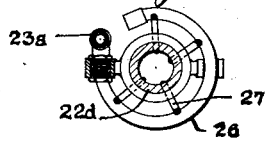
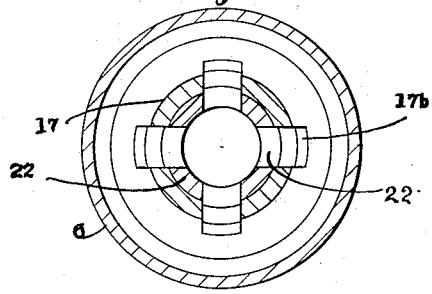
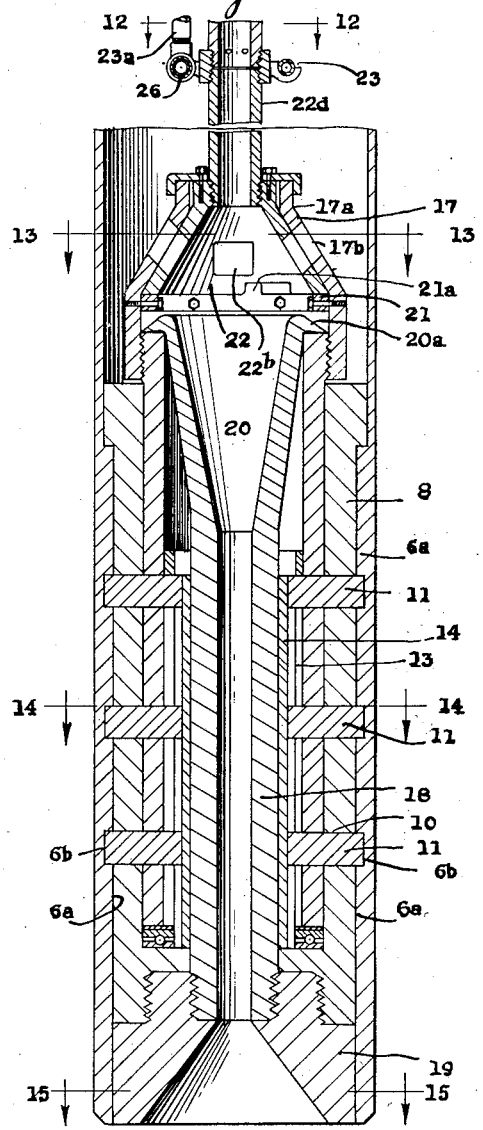
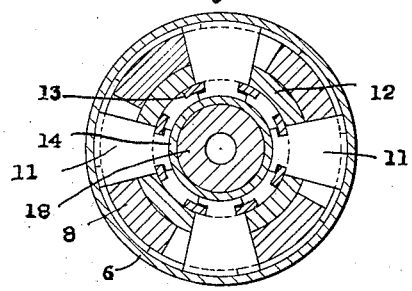
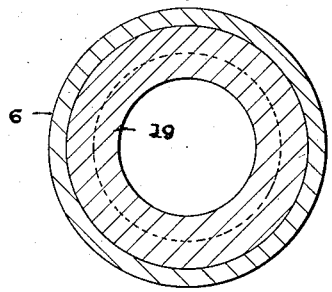
INVENTOR
RICHARD P. SIMMONS.
BY
ATTORNEY Patented Feb. 7, 1933

1,896,111

UNITED STATES PATENT OFFICE

RICHARD P. SIMMONS, OF NEW YORK, N. Y.

METHOD OF MAINTAINING OIL WELLS IN FLOWING CONDITION AND CONSERVING THE NATURAL GAS SUPPLY THEREOF

Application filed November 6, 1930. Serial No. 493,768.

This invention relates to improvements in means for causing oil wells to flow, and consists in part of a continuation of subject matter divided from my copending application for patent, Serial 192,449, filed May 18th, 1927, well drilling apparatus, a continuation in part of subject matter disclosed in my copending application for patent, Serial 272,799, filed April 25th, 1928, and additional subject matter herein disclosed.

The current practice of constructing and operating oil wells involves the progressive deepening of the well hole, with a progressive reduction of the diameter of the hole as its depth is increased. The maximum depth of the well forms the original entrance into the ground, and this is provided with a well casing of relatively large diameter, which terminates at the bottom of the largest or original hole. The next smallest diameter hole is then drilled and a corresponding well casing is placed against its wall, but this casing extends to the head of the well, through the previously placed larger casing. A third hole length of still smaller diameter is then drilled and a well casing of corresponding size is placed within, but which extends to the head of the well, through the two previously placed well casings. This process is continued and a tubing of approximately three inches in diameter is placed in position, and in this tubing a plunger pump unit, operated by sucker rods, is installed at the bottom of the well.

The present invention embraces a pumping system which is disclosed in connection with an oil well having a diameter considerably in excess of the present oil wells, the final diameter of which really fixes their size and capacity, and a well casing of uniform diameter which extends from the head of the well to its base, and in which equipment is installed for supplying gaseous fluid under pressure to the discharging column of oil, to insure the adequate delivery of oil from the well.

One of the objects of the invention is the provision of an oil well with means for supplying gaseous fluid under pressure to the oil discharge line, at different levels, so that uniform discharge movement can be maintained, and a moderate pressure generated in the gaseous fluid because of the different levels at which induction thereof takes place.

Another object of the invention is to provide an oil well with means for causing the natural gas pressure to be concentrated in the oil discharge conduit of the oil well, while at the same time providing variable means for venting the natural gas into the well itself, when it is desired to regulate the flow of the oil from the well.

Another object is to provide means for utilizing the natural gas pressure of an oil well to obtain a controlled discharge of the oil therefrom, and to conserve the natural gas supply, so as to prolong the life of the oil well.

A still further object of the invention is the provision of an oil well with means for controlling the discharge of the natural gas from the oil well, so as to maintain over a prolonged period of time the natural gas supply with but moderate reduction of pressure, and to supply gaseous fluid under pressure generated externally to the oil discharge line, when the natural gas supply no longer has sufficient pressure to lift the oil to the head of the well.

A still further object of the invention is the provision of an oil well with a casing of abnormal diameter extending to the base of the well, a reduction locking head having means for being locked to the casing, and additional means for causing the natural gas supply to be concentrated upon the discharging oil column, constructed to permit of the controlled venting of the natural gas to the oil well chamber externally of the oil discharge conduit, so that the flow of the oil may be regulated at will, when the natural gas pressure is within working limits.

A still further object of the invention is the provision of a simple valve for controlling the venting of the natural gas to the oil well chamber, which can be operated by turning the oil discharge conduit at the head of the well.

A still further object of the invention is the provision of a gaseous oil lift having a series of induction devices located at different levels, and a series of induction jets for each device, to supply gaseous fluid under pressure to the oil discharge column, whereby the oil will be progressively lifted from one level to the other with the aid of the gaseous fluid supplied under compression.

A still further object of the invention is the provision of a method of controlling the discharge of the natural gas supply from an oil well, so that the gas pressure can be conserved to the utmost and used only, at will, for the lifting of the oil, which method can also be employed for causing the oil and gas to separate within the well.

With the above and other objects in view the invention relates to certain new and useful combinations, constructions, arrangements of parts, and method steps, shown in the accompanying drawings, in which:—

Fig. 1 is a vertical sectional view through a well of abnormal diameter, showing one form of a composite well casing in place therein, to illustrate the first step in carrying out the improved method.

Fig. 2 is a similar view, showing the intake of the oil well completed.

Fig. 3 is another similar view showing the combined reduction head and gaseous lifting device installed in place at the bottom of the oil well.

Fig. 4 is a vertical sectional view through a well of abnormal diameter, partly completed, showing another form of well casing therein.

Fig. 5 is a similar view, showing the intake of the oil well completed.

Fig. 6 is another similar view showing the combined reduction locking head and the reduction head installed in position at the bottom of the well.

Fig. 8 is a side elevation of the combined locking and reducing head.

Fig. 9 is a sectional perspective view of the lower end section of the well casing.

Fig. 10 is a transverse sectional view, taken on line 10—10 of Fig. 8.

Fig. 11 is a vertical sectional view through the combined locking and reducing head, and the well casing.

Fig. 12 is a detail transverse sectional view, taken on line 12—12 of Fig. 11, looking in the direction of the arrows, but showing only the induction device.

Fig. 13 is a transverse sectional view, taken on line 13—13 of Fig. 11, looking in the direction of the arrows.

Fig. 14 is a similar view, taken on line 14—14 of Fig. 11, looking in the direction of the arrows.

Fig. 15 is another similar view taken on line 15—15 of Fig. 11, looking in the direction of the arrows.

Fig. 18 is a similar view of the inner valve cone of the reduction head.

Fig. 19 is a similar view of the limit stop ring of the valve assembly of the reduction head.

Fig. 20 is a vertical sectional view illustrating the method of puncturing the cap rock to provide a restricted passage from the oil deposit to the well.

Figure 7:
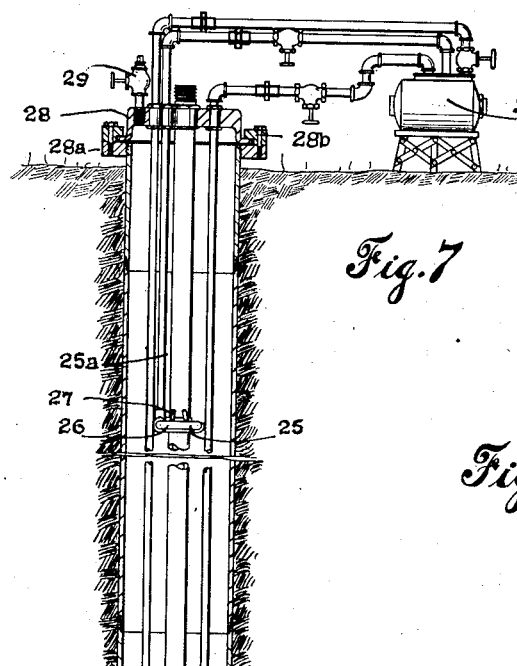
Fig. 7 is another similar view, showing the equipment for supplying gaseous fluid under pressure to different levels of the discharge conduit of the oil well, and the means for controlling the gas pressure in the oil well chamber.

In the ordinary construction and operation of oil wells, which tap natural reservoirs having relatively high natural gas pressure, the oil and gas will usually gush forth when the intake of the oil well is completed, and an enormous quantity of oil and gas is wasted when an oil well of the so-called gusher type is opened. The oil and gas are caused to discharge through a small well casing, which has a diameter of less than six inches in most cases. In this well casing the enormous pressure of the oil and gas is caused to discharge.

With the view of preventing this wasteful discharge of both oil and gas I construct a well A having a uniform diameter from its head to its base, and of abnormal size, considering existing practice. This well would be of a size of approximately twenty-four inches, and this diameter would continue from the top of the well to its base.

As this well A is constructed a well casing B is progressively lowered into the well. The lower end of this well casing is equipped with a base section $B^1$, which is provided with an internal wall $B^2$ formed with internal screw threads $B^3$. The upper end of this base section is also formed with internal screw threads $B^4$, which are coupled to the lower end of the casing section C. This casing section C is provided with a tubular wall $C^1$, which is equipped with external flanges, which are disposed helically thereon, and which are enclosed by the shell section $C^2$, the lower end of which is threaded or otherwise coupled to the lower end of the casing section C. The flanges $C^3$ serve to space the wall $C^1$ from the shell $C^2$, to provide a space therebetween.

The tubular wall $C^1$ is formed with openings $C^4$, which are located above the screw threaded connection between the shell section $C^2$ and the casing section C. The upper end of the shell section $C^2$ is connected to a coupling ring D by engaging screw threads, and in this coupling ring the casing section E is coupled by engaging screw threads at its lower end. The upper end of this casing section E is connected to the casing section F, which is shown to consist of a double tubular wall structure, filled with cement. The casing section E is equipped with core holding means E¹, which is useful when the well is being drilled for holding the core produced by the rotation of the well casing.

The lower end of the coupling ring D is bevelled and is spaced out of contact with the upper end of the tubular wall C¹, to provide an annular passage therebetween.

In carrying out the method the well chamber A is carried to a point above the natural oil and gas reservoir R, and the casing assembly described is progressively lowered to place. The rock cap covering the reservoir is then pierced to form a hole A', to provide an intake for the oil well, which is shown to have a diameter approximately equal to the bore of the casing section B.

With the well completed as shown in Fig. 2, the next step is to install the reduction cone G, shown in Fig. 3. This cone is formed with a cylindrical skirt which is threaded in the screw threads B³. The cone is provided with a central upstanding nipple G¹, in which the lower end of the oil discharge conduit H is threaded or otherwise positively coupled. Between the cylindrical skirt of the reduction cone and the upstanding nipple thereof the conduit J is connected. The oil discharge conduit H and the conduit J both extend to the head of the well. The conduit J is connected to a suitable supply source for furnishing compressed air or other gaseous fluid under compression to the discharge pipe H.

By changing the location of the reduction cone G in the casing section B, from the position below the openings C⁴, shown in Fig. 3, to one above these openings, the gas pressure may be vented directly into the oil well, instead of being forced to discharge directly through the conduit H.

When the natural gas pressure drops to a point insufficient to lift the oil to the surface of the well, the conduit J may be utilized, and compressed air or other gaseous fluid may be discharged into the rising oil column and it is caused to flow above the well to any suitable container connected therewith.

When the gas is permitted to flow through the openings C⁴ a reduction of pressure of the gas, due to its expansion, will take place, and with this reduction and expansion, the oil will tend to settle back into the bottom of the well chamber A, thus accumulating a pool of oil, as shown in Fig. 3.

By raising the cone above the venting openings, C⁴ the gas pressure may be regulated within certain limits, and the flow of oil from the well may be controlled within these limits, that is if the gas pressure when expansion has occurred is still insufficient to lift the oil to the head of the well.

Figure 16:
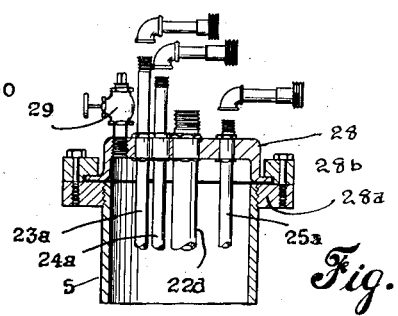
Fig. 16 is a vertical sectional view taken through the head of a well casing, showing the conduits thereof.
Figure 17:
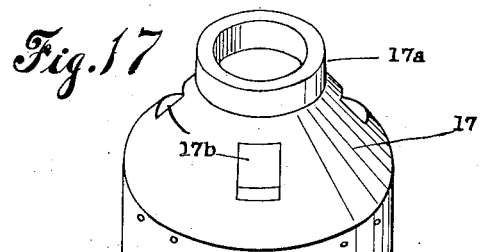
Fig. 17 is a view in perspective of the outer valve cone of the reduction head.

In Figs. 4 to 19, inclusive, I show a development of the method illustrated in Figs. 1 to 3, inclusive. Referring to the latter figures 5 designates the well casing, which is abnormal in diameter, of approximately twenty-four inches, and includes tubular sections coupled together at the joints 5'. The lower casing section 6 is formed with a series of internal longitudinally disposed and circumferentially spaced keys 6ª. The upper end of each of these keys is rounded and each key is formed with transverse grooves 6ᵇ, which are spaced above each other in series; the grooves of the whole series of keys being arranged in common planes. The longitudinal keys provide means for effecting a locking connection with the casing to prevent relative rotation, while the transverse grooves 6ᵇ provide means for locking a unit to the casing to prevent relatively longitudinal movement therein.

The well is constructed of uniform diameter to the base thereof, and the casing 5 is progressively lowered as the well is constructed. Unlike conventional well casings this twenty-four inch well casing performs the work of the whole series of well casings usually employed, and has a uniform diameter from its top to its bottom. The intake opening A' is then formed, thus permitting the oil and gas to enter the well. Due to the large diameter of the well gushing of the oil and gas will not take place in many districts pierced by such a well.

A combined locking and reduction unit or head 7 is then inserted in the well casing and locked to the keys 6a of the lower section 6 thereof, to prevent relative rotative and relative longitudinal movement.

This combined device includes features which are specifically claimed in my copending application for patent, Serial No. 478,112, filed August 27, 1930.

This combined device includes the tubular housing 8, which is formed with longitudinal external keys 9 adapted to snugly fit between the keys 6a of the well casing. This housing is also formed with transverse slots 10, which extend through the keys 9, and are adapted to register with the grooves 6b, and through these slots 10 the key lugs 11 are mounted to slide so that they will normally correspond in their extended outer end portions with the width of the keys 9 and may be shifted circumferentially to enter the grooves 6ᵇ in the keys 6ª.

The inner ends of the key lugs 11 are engaged by the tubular member 12, which fits snugly for turning movement within the housing 8, and is provided with slots which receive the inner ends of the lugs. The inner ends of these key lugs, inwardly of the tube 12, are coupled to the spacing member 13, and work against the dirt guarding tube 14. The tube 12 and the spacing member 13 are supported at their lower ends by the thrust ball bearing ring 15.

The upper end of the tube 12 is coupled, as by screw threads, to the cylindrical skirt 16 of the outer valve cone 17, the upper end of which is formed with a nipple 17a, shown to be cylindrical. The conical body wall of this member 17 is formed with vent openings 17b, shown to be three in number, which are spaced apart equal distances from each other.

Within the dirt guarding tube a thick walled tube or conduit 18 is disposed, the lower end of which is threaded to the ring 19, which is threaded in the lower end of the tubular housing 8. The upper end of the conduit 18 is flared out to provide an expansion head 20, which has a terminal flange 20a to engage the upper end of the turning tube 12. Within the cylindrical skirt of the outer cone a ring 21 is secured in place, which is provided with a plurality of limit stops 21a, spaced equal distances apart, which project upwardly. A movable valve cone 22 is arranged within the outer or stationary cone 17, and the wider lower end thereof is formed with recesses 22a to receive the limit stops 21a, the recesses being considerably longer than the width of the stops, so that the valve cone may have a limited movement on the ring 21. The valve cone is further provided with vent openings 22b which are designed to register with the vent openings 17b of the outer valve cone 17. The upper end of the movable valve cone 22 is coupled by screw threads or otherwise to the oil discharge conduit 23, which extends to the head of the well.

By turning the oil discharge conduit the tube 12 may be manipulated to shift the key lugs 11 into locking relation with the well casing. By the application of pressure on the oil discharge conduit the combined locking and reduction head may be coupled to the lower section of the well casing.

To open and close the valve the oil conduit line is also turned. The resistance offered by the locking elements is sufficient to prevent accidental unlocking of the reduction head when the valve is being operated.

The oil discharge pipe is equipped with a series of induction devices 23, 24, and 25, each device being a duplicate of the other. Each device includes a ring member 26, which is coupled to the oil conduit. One end of the ring member is equipped with a sealing nipple 26a and the other end is coupled to a supply pipe. The induction device 23 communicates with a supply pipe 23a, which extends to the head of the well, the induction device 24 is in communication with the supply pipe 24a, and also extends to the head of the well, and the induction pipe or device 25 is in communication with the supply pipe 25a, and likewise extends to the head of the well. Each induction device communicates with the interior of the oil conduit by means of jet tubes 27, which are inserted in the wall of the oil discharge conduit in rising angles.

The oil discharge conduit and the supply pipes for the induction devices extend through the well cap or closure 28, which is bolted to the upper end of the well casing. This cap seals the oil well against the free discharge of gas, and is equipped with a blow off valve 29 for regulating the gas pressure in the oil well itself.

The series of supply pipes are connected in communication with a supply source or tank 30, which holds air under compression, or any other suitable gaseous fluid under compression. Each of the supply pipes is provided with a manually controlled valve.

When the equipment, consisting of the combined locking and reduction head, is installed in a newly opened well, the valve will be left open, so that the effort to place the combined unit in position will not be too great.

If the natural gas pressure of the oil well is very great the valve may be allowed to remain open. This will permit the gas to expand in the oil well, causing a reduction of pressure in the oil conduit or discharge pipe, and also a separation of the gas and oil in the oil well. The gas may thus be withdrawn separately from the oil, or one may be withdrawn without drawing off the other.

When the gas pressure drops below the point where it is sufficient of itself to lift the oil to the head of the well, the induction devices are utilized and gaseous fluid under sufficient pressure is supplied to the oil discharge conduit at one or more levels, or at all levels, so as to general a flowing pressure from the well.

By the use of several induction devices at different charging levels, it is necessary to admit pressure gas under a pressure sufficient to maintain flow from one level to the next, instead of having a pressure sufficient to carry the oil all the way to the head of the well.

By allowing the gas flowing from the natural reservoir to enter the chamber of the well and expand, the oil carried by the gas into the well will separate, and by accumulating over the intake of the well will tend to retard the discharge of gas from the reservoir, so that the natural pressure in the reservoir will be maintained for a prolonged period of time.

The method as developed with the equipment shown in Figs. 4 to 19, inclusive, thus provides for the venting of the excess gas into the well, separately from the discharge conduit, to cause the oil and gas to separate, as a result of the expansion of the gas in the well chamber, or permits of the full concentration of the gas pressure upon the mass of oil carried into the oil discharge conduit.

When it is desired to stop the flow of oil from the well, at a time when the natural gas pressure is high, the valve ports can be opened, causing the gas to flow into the main chamber of the well and separate from the oil. By withdrawing the gas from the top of the well the gas pressure of the well may be controlled, and by shutting off the oil discharge conduit delivery of oil from the well may be prevented.

The connections between the pressure tank and the supply pipes connected with the induction devices, above the well cap, include telescopic joints, and swivel connections, the details of which need not be fully described, all arranged to permit the cap of the well to be turned bodily on the well, or to permit the oil discharge conduit to be turned in the well cap, for the purpose of operating the venting valve, which controls the by-pass into the well chamber.

This arrangement of a large diameter oil well, of approximately twenty-four inches in diameter, and a reduction head equipped with an oil discharge conduit of much smaller diameter, and providing a controllable by-pass into the chamber of the large diameter well, converts the main well chamber, externally of the oil discharge pipe, into an oil storing and accumulating reservoir, in which the mineral oil may be stored against danger of fire or loss.

The method can be carried out, also by stopping the well casing at a point above the natural gas reservoir, which can be fairly calculated by the approximate diameter of the rock covering. The reducing head is then inserted and locked in place, without any expulsive gas pressure to overcome. As this reducing head is provided with an axial passage approximately the size of the discharge conduit utilized, an intake passage for the oil well can be drilled with any suitable drilling equipment, either rotary of percussive, through the axial passage of the reducing head and the rock cap or covering of the natural oil and gas reservoir below the same, and thus establishing an intake for the oil and gas which is considerably smaller in diameter than the large diameter oil well.

After the locking head and its casing have been secured in place at the bottom of the large diameter well, it is necessary (Fig. 20) to drill the small diameter intake through the reducer, and through the oil discharge pipe, which controls the rotary valves of the reducer and extends to the head of the well. This is done by means of a rotary or a reciprocating drill 31. By reciprocating, or rotating this drill from the head of the well, the small diameter intake is formed.

When the cap rock over the oil and gas deposit is pierced the drill will be forced upward, or subjected to an expulsive pressure, if not held above the well against the released gas pressure. The drill is raised above the small diameter intake until it passes the side ports of the flow reducer. The rotary valves of the flow reducer being open, the mixed stream of oil and gas will flow into the well, thereby relieving the pressure of the discharging oil stream, so that it can be controlled.

When the reducing head is inserted in place at the bottom of the large diameter oil well, the discharge conduit is connected therewith. When the intake opening of the oil well is completed by drilling through the reduction head the pressure of the natural gas and oil will cause the drilling equipment to be blown upward, at least above the by-pass or valve openings of the reducing head, which would be held open. This would permit the natural gas to vent directly into the well, thus reducing the effective pressure in the discharge conduit, and, of course, checking the force generated in the discharge conduit to cause the well to gush a large mass of oil and gas out of control.

As a result of this operation the gas may be withdrawn from the well itself, while the lifting pressure on the oil flowing in the discharge conduit will be reduced, and may be more readily and safely controlled.

Having described my invention I claim as new:—

1. The method of constructing an oil well which consists of drilling the well to a point just above the natural oil deposit, disposing a flow reducer in place at the base of the well, establishing a discharge pipe from said flow reducer to the head of the well, and then piercing the wall between the bottom of the well and the oil deposit.

2. The method of constructing an oil well which consists of drilling the well to a point just above the oil deposit, locking a flow reducer in the bottom of the well to prevent its displacement upward, providing a discharge pipe from said reducer to the head of the well, and piercing the bottom wall of the well through to the oil deposit.

3. The method of constructing an oil well which consists of drilling the well to a point just above the natural oil deposit, locking in the bottom of the well a member having a restricted passage therethrough, providing a discharge conduit from said passage to the head of the well, and piercing the bottom wall of the well through said restricted passage to the oil deposit.

4. The method of constructing an oil well which consists of drilling the well to a point just above the natural oil deposit, locking in the bottom of the well a filler member having a restricted passage therethrough, providing a discharge conduit from said passage to the head of the well, interposing a valve in said conduit, and then piercing the bottom wall of the well through said passage to the oil deposit with the valve in a position to effect by-passing of the subsequential flowing oil into the well exterior to said conduit.

5. The method of constructing an oil well which consists of drilling the well to a point just above the natural oil deposit, locking in the bottom of the well a filler block provided with a restricted passage therethrough, providing a discharge conduit from the passage in said filler to the head of the well, providing a valve adjacent said filler block to establish communication between the passage thereof and the interior of the well, and then breaking through the bottom wall of the well to the oil deposit with the passage in said filler block as a guide for the tool, said valve being maintained in at least partial open position in effecting communication with the oil deposit.

6. An oil well comprising a casing of relatively large diameter extending from the surface to the bottom of the well, a flow reducer comprising a filler having an interlocking connection with the casing at the bottom thereof and provided with a restricted axial passage, a valve mounted at the top of said filler to effect communication between said passage and the interior of said casing, and a conduit extending from said valve to the head of the well and continuously in communication with said passage, the filler having means to effect said interlocking connection on angular or turning movement in the casing, the conduit being rotatable to effect opening and closing movement of the valve and thereafter to effect actuation of the filler interlocking means.

7. An oil well comprising a casing of relatively large diameter extending from the surface to the bottom of the well, a flow reducer comprising a filler having an interlocking connection with the casing at the bottom thereof and provided with a restricted axial passage, a valve mounted at the top of said filler to effect communication between said passage and the interior of said casing, and a conduit extending from said valve to the head of the well and continuously in communication with said passage, the filler having means to effect said interlocking connection on angular or turning movement in the casing, the conduit being rotatable to effect opening and closing movement of the valve and thereafter to effect actuation of the filler interlocking means, the valve consisting of telescopically connected conical elements of which one is connected with the conduit and the other with the filler.

8. An oil well comprising a casing of relatively large diameter extending from the surface to the bottom of the well, a flow reducer comprising a filler having an interlocking connection with the casing at the bottom thereof and provided with a restricted axial passage, a valve mounted at the top of said filler to effect communication between said passage and the interior of said casing, and a conduit extending from said valve to the head of the well and continuously in communication with said passage, the filler having means to effect said interlocking connection on angular or turning movement in the casing, the conduit being rotatable to effect opening and closing movement of the valve and thereafter to effect actuation of the filler interlocking means, the valve consisting of telescopically related conical elements having their axes in alignment with said passage.

9. An oil well comprising a casing of relatively large diameter extending from the surface to the bottom of the well, a flow reducer comprising a filler having an interlocking connection with the casing at the bottom thereof and provided with a restricted axial passage, a valve mounted at the top of said filler to effect communication between said passage and the interior of said casing, and a conduit extending from said valve to the head of the well and continuously in communication with said passage, the filler having means to effect said interlocking connection on angular or turning movement in the casing, the conduit being rotatable to effect opening and closing movement of the valve and thereafter to effect actuation of the filler interlocking means, the valve consisting of telescopically related conical elements having their axes in alignment with said passage, one of said elements being connected with the conduit and the other with the filler.

In testimony whereof I affix my signature.

RICHARD P. SIMMONS.